Patented Dec. 5, 1950

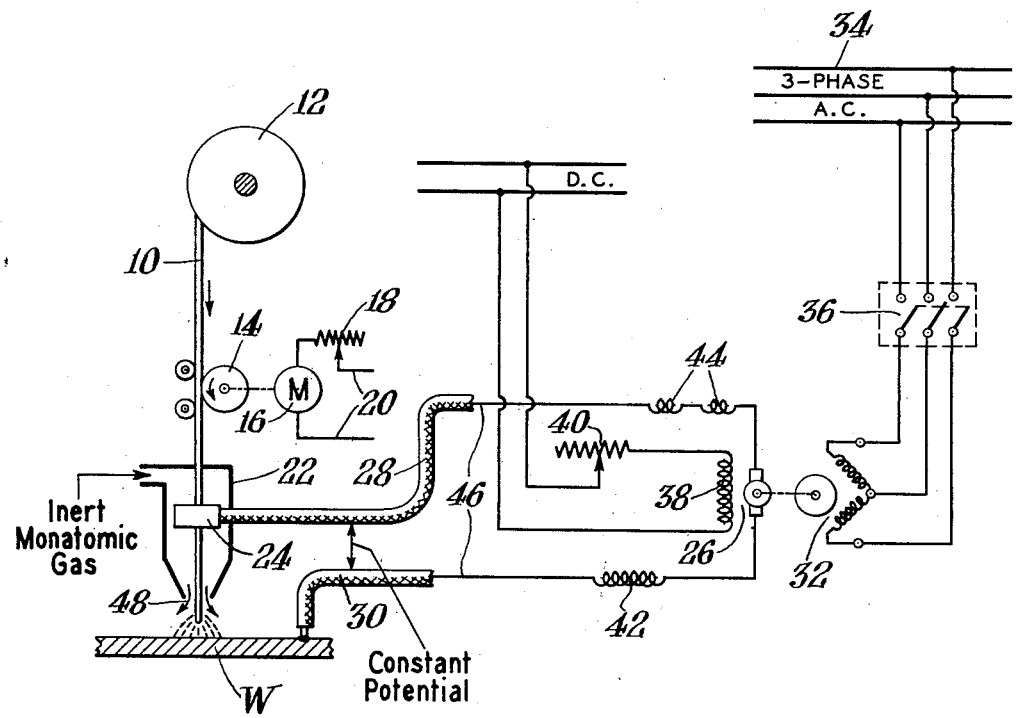

2,532,410

UNITED STATES PATENT OFFICE 2,532,410

INERT MONATOMIC GAS SHIELDED METAL-ARC WELDING PROCESS

Harry E. Kennedy, Berkeley, Calif., assignor to The Linde Air Products Company, a corporation of Ohio Application October 29, 1949, Serial No. 124,399

3 Claims. (Cl. 219—10)

This invention relates to electric welding, and more particularly to the metal-arc welding of refractory oxide metals such as aluminum, stainless steel and magnesium in a stream of inert monatomic gas such as argon and/or helium with an electrode of filler metal which is mechanically fed toward the welding zone.

In this type of welding it has been customary in the past to control the rod feed speed by means which is responsive to changes in the arc voltage so as to keep the arc voltage as constant as possible, the welding current source having a drooping voltage-current characteristic to stabilize the operation and to provide a starting or open-circuit voltage which is substantially higher than the welding or arc voltage. Such controls are expensive to buy and maintain.

I have discovered, however, that the inert atmosphere of argon and/or helium provides enough stabilizing influence on the arc in this type of welding to make possible the use of a current source of relatively low constant potential, thereby eliminating the need for any stabilizing reactance or resistance in the welding circuit, as well as the need for any automatic controls; the rod being fed at any desired substantially constant rate toward the work.

Therefore, according to the invention, there is provided a process of electric welding work consisting of a refractory-oxide metal of the class consisting of aluminum, stainless steel, and magnesium, which comprises applying a relatively low (20–28 volts) potential of a welding current source across a welding rod of such metal and the work, discharging a stream of inert monatomic gas of the class consisting of argon and helium around the end portion of such rod and against the work, and rapidly feeding such rod toward the work at a substantially constant speed. As the end of the rod touches the work, the welding current from such source flows through the end of the rod and the work, fusing the metal under the stream of inert gas and starting the operation. The rod is then moved with the so discharged gas stream along a desired path to be welded on the work, while the potential of the welding current source is kept at substantially the same relatively low voltage as at the start of the operation, and the rod-feeding movement is also kept at the same rapid rate as at the start of the operation. The welding current source may be a compound generator having a relatively flat voltage-current characteristic, or a standard welding generator provided with a voltage regulator adapted to supply the welding current at a potential which is substantially constant between no load (open circuit) and full load current values. Such potential is relatively low and safe at all times. The resulting circuit is simple, efficient, and easy to maintain.

In the drawing, the single figure is a diagrammatic view, partly in elevation, of an inert monatomic-gas shielded metal-arc welding system illustrating the invention.

As shown in the drawing, a bare rod 10 of aluminum, for example, is drawn from a reel 12 by a wheel 14 which is driven by an electric motor 16 at a substantially constant speed determined by the setting of a rheostat 18 in the input circuit 20 of the motor. The rod is fed by the wheel 14 through a welding gun 22 containing a brush 24 in electrical contact with the rod. An inert monatomic gas of argon, for example, is supplied to the gun 22, flows around the brush 24, and is discharged around the end portion of the rod 10 and against the work W composed of aluminum which is to be welded. The brush 24 and work W (consisting of sheets held in side-by-side contact) are connected directly to a constant potential source of welding current, such as a compound generator 26, by leads 28 and 30 consisting of insulated conductors of low resistance.

The generator 26 is driven at a constant speed by an A. C. motor 32 which is connected to an A. C. supply line 34 through a switch 36. The shunt field winding 38 of the generator is separately excited from a D. C. supply line through a rheostat 40, while the series field winding 42 and the interpole winding 44 are connected in series with the output circuit 46. The generator 26 should have an output voltage of between 20 and 30 volts and a current capacity of several hundred amperes. The generator voltage-current characteristic should be flat to within ±0.5 volts between no load (open circuit) and full load values.

In operation, the rod 10 is fed toward the work W at full speed, after the inert gas has been turned on and the welding gun has been pointed toward the work and positioned close enough to the starting point so that the inert gas stream 48 flows over the work. When the end of the rod touches the work, current flowing from the generator through the rod and work, fuses the end of the rod and the adjacent work metal, starting the weld. The gun is then moved along a desired path to be welded in the work, while the rod feed is kept at substantially the same rapid rate. The generator also keeps the potential applied between the rod and the work at the same substantially constant voltage.

The stream of argon not only protects the heated metal from oxidation, but also stabilizes the arc to such an extent that automatic variations of the rod feed to keep constant the arc length are not necessary. Also, the new system avoids the need for any arc stabilizing resistance or reactance in the welding circuit. The resulting welds are clean, free of flux, and sound.

While direct current is preferred for welding, according to the invention, alternating current may be used without departing therefrom.

I claim:

1. An inert monatomic gas-shielded metal-arc welding process which comprises applying a relatively low voltage of the order of 20 to 28 volts from a welding current source of constant potential across a bare metal welding rod and metal work composed of a refractory-oxide metal selected from the class consisting of aluminum, stainless steel and magnesium, discharging a stream of inert monatomic gas around the end portion of such rod and against the work, feeding the rod toward the work at a substantially constant relatively rapid rate sufficient for fusing the end of such rod and the adjacent work metal with welding current flowing from such source through the end portion of the rod and the work under such stream of inert gas, and moving the rod and gas stream along a desired path to be welded on the work while maintaining substantially constant both the rapid rate of rod feed and the relatively low voltage of such potential.

2. An inert gas shielded metal-arc welding system comprising the combination of means including a motor for feeding a bare welding rod composed of a refractory-oxide metal selected from the group consisting of aluminum, stainless steel and magnesium at a substantially constant speed toward work composed of a like metal, a brush in contact with such rod, a constant potential source of welding current, leads of relatively low resistance connecting such source directly to said brush and the work, and means including a welding gun for conducting an inert monatomic gas over such brush and then discharging a stream of such gas around the end portion of such rod and against the work, which gas not only prevents oxidation of the heated metal but also stabilizes the arc to such an extent that the need for any resistance or reactance component in the welding circuit is avoided.

3. Process of welding which comprises supporting in side-by-side relation sheets composed of a refractory-oxide metal selected from the group consisting of aluminum, stainless steel, magnesium, and the alloys thereof, moving a welding gun along a path parallel to the seam formed by such sheets, feeding a welding rod through such gun toward such seam at a relatively constant rate, discharging from such gun around the emerging end portion of such rod a stream of inert monatomic gas selected from the group consisting of argon and helium, supplying welding current to such sheets and rod from a substantially constant potential source, and progressively fusing the end of the rod and the sheets along such seam under such inert gas stream which stabilizes the operation.

HARRY E. KENNEDY.

REFERENCES CITED

The following references are of record in the file of this patent:

UNITED STATES PATENTS

| Number | Name | Date |
|---|---|---|
| 1,669,099 | Noble | May 8, 1928 |
| 2,300,670 | Hopkins | Nov. 3, 1942 |
| 2,332,950 | Tannheim | Oct. 26, 1943 |